(12) United States Patent
Kobayashi et al.

(10) Patent No.: US 6,207,762 B1
(45) Date of Patent: Mar. 27, 2001

(54) THERMALLY REVERSIBLE CROSSLINKED MATTER AND ITS USE

(75) Inventors: Nobuhiro Kobayashi, Takatsuki; Masatoshi Yoshida, Nara, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/055,155

(22) Filed: Apr. 4, 1998

(30) Foreign Application Priority Data

Apr. 11, 1997 (JP) ................................................. 9-094223

(51) Int. Cl.$^7$ .......................... C08F 26/06; C08F 126/06; C08F 226/06
(52) U.S. Cl. .................... 525/327.1; 525/92 R; 525/168; 525/186; 525/194; 525/375; 528/407
(58) Field of Search .................... 525/375, 92 R, 525/168, 186, 194, 327.1; 528/407

(56) References Cited

U.S. PATENT DOCUMENTS

| | | |
|---|---|---|
| 3,435,003 | 3/1969 | Craven et al. . |
| 3,678,016 | 7/1972 | Zimmerman et al. . |
| 4,045,517 | 8/1977 | Guerin et al. . |
| 4,152,189 | 5/1979 | Guerin et al. . |
| 4,395,525 | 7/1983 | Fischer et al. . |
| 4,423,182 | 12/1983 | Bartman . |
| 5,633,341 | 5/1997 | Abend . |

FOREIGN PATENT DOCUMENTS

| | | |
|---|---|---|
| 1 238 945 | 7/1971 | (GB) . |
| 50-139135 | 11/1975 | (JP) . |
| 51-19035 | 2/1976 | (JP) . |
| 52-65549 | 5/1977 | (JP) . |
| 56-14573 | 2/1981 | (JP) . |
| 56-57865 | 5/1981 | (JP) . |
| 57-158275 | 9/1982 | (JP) . |
| 58-125774 | 7/1983 | (JP) . |
| 5-202345 | 8/1993 | (JP) . |
| WO 94/04624 | 3/1994 | (WO) . |

*Primary Examiner*—Kriellion Sanders

(57) ABSTRACT

The invention provides a thermally reversible crosslinked matter, which displays a sufficiently low melt viscosity during heating and is also excellent in the stability of the melt viscosity, and further provides a hot melt resin comprising this crosslinked matter. The thermally reversible crosslinked matter comprises a compound (A)-based moiety and a compound (B)-based moiety, wherein both moieties are bonded to each other through a crosslinked structure, which is characterized in that: the crosslinked structure includes a structure making steric hindrance, and breaks due to heating and then reverts due to cooling; and when the crosslinked structure breaks due to heating, the melt viscosity of the thermally reversible crosslinked matter decreases to not higher than twice the melt viscosity of compound (A) alone or the melt viscosity of compound (B) alone, whichever is higher, as heated at the same temperature that the thermally reversible crosslinked matter is heated at.

16 Claims, No Drawings

THERMALLY REVERSIBLE CROSSLINKED MATTER AND ITS USE

BACKGROUND OF THE INVENTION

A. Technical Field

The present invention relates to a thermally reversible crosslinked matter and a hot melt resin comprising this crosslinked matter.

B. Background Art

A thermoplastic resin melts and thereby falls into a state of mold-processability when heated to high temperature, and then falls into a state of having strength durable to use when cooled. Therefore, the thermoplastic resin is widely and conveniently used in the world.

However, although the viscosity of the thermoplastic resin standing in a melted state due to heating, in general, fully satisfies the mold-processability, the strength or heat resistance of the thermoplastic resin is not high at temperature where the thermoplastic resin is used. Therefore, the use range of the thermoplastic resin is limited.

A block copolymer, represented by SIS (styrene-isoprene-styrene), forms a pseudocrosslinked structure due to concentration of high-Tg polymer blocks at normal temperature, and the viscosity of the block copolymer decreases at or above Tg so much that the pseudocrosslinked structure breaks and thereby falls into a state of mold-processability. Therefore, the block copolymer has the mold-processability at relatively high temperature and the strength or heat resistance at use temperature without conflict. However, because the pseudocrosslinked structure is dominated by Tg of the copolymer itself, there are problems in that the heat resistance is inherently deficient.

Many suggestions have been made that the above-mentioned problems of the thermoplastic resin should be solved by introducing into the thermoplastic resin a real, thermally reversible crosslinked structure, in other words, a crosslinked structure which breaks due to heating and then reverts due to cooling. However, any of these suggestions has problems.

JP-A-50-139135 and JP-A-51-019035 disclose thermoplastic resins in which acrylic polymers having carboxyl groups are crosslinked with metal ions. JP-A-56-014573 discloses a thermoplastic resin as produced by adding maleic anhydride to a low molecular polyisoprene and crosslinking with metal ions. In addition, JP-A-05-202345 discloses a thermoplastic resin comprising an acrylic polymer having carboxyl groups as neutralized with polyvalent metals. These thermoplastic resins containing metal-crosslinked structures are more excellent than the block copolymer, represented by SIS, with regard to the heat resistance, but have problems in that: the melt viscosity during heating is high (because the metal ion crosslinkage is so relatively strong that it is difficult to break even if heated), the thermal stability during heating is low (because, especially, in the case where an ester group is present in the polymer, the metal plays a catalytic part in forming a crosslinkage between organic high molecules, whereby a covalent bond is gradually formed between the organic high molecules), and the melting temperature gradually rises.

JP-A-58-125774 discloses a thermoplastic resin which comprises an acrylic polymer having carboxyl groups as neutralized with polyvalent metals and further comprises an o-methoxyaryl acid. This thermoplastic resin has effects in that its melt viscosity decreases during heating, when compared with the above-mentioned conventional metal ion-crosslinked matters, but has problems in that the melt viscosity of the crosslinked matter is too high when compared with a noncrosslinked one, and therefore, still in this case, the thermal stability during heating is poor because a covalent bond is gradually formed due to heating.

JP-A-52-065549 discloses a thermoplastic resin which comprises a mixture of a polymer containing acid groups with a polymer containing amino groups. JP-A-56-057865 discloses a thermoplastic resin as produced by copolymerizing (meth)acrylamide with an olefinic unsaturated mono- or dicarboxylic acid. JP-A-57-158275 discloses a thermoplastic resin which comprises a major proportion of an acrylic polymer having amino groups in the molecular inside and carboxyl groups at molecular terminals. These thermoplastic resins utilizing an ion crosslinkage as formed between the acid and the amino group also have problems in that: the formed ion crosslinkage is so strong that it is difficult to break even if heated, and the melt viscosity is therefore high; and a thermally irreversible amide bond is formed between the acid and the amino group, and therefore, still in this case, the thermal stability during heating is low.

SUMMARY OF THE INVENTION

A. Object of the Invention

An object of the present invention is to provide a thermally reversible crosslinked matter, which displays a sufficiently low melt viscosity during heating and is also excellent in the stability of the melt viscosity, and further to provide a hot melt resin comprising this crosslinked matter.

B. Disclosure of the Invention

The present inventors diligently studied to solve the above-mentioned problems, and as a result, found that if an amino groups-containing compound having a hindered structure (steric hindrance structure) is used as an amino groups-containing compound comprising a thermally reversible ion crosslinkage as formed between an acid group and an amino group, then a thermally reversible crosslinked matter can be obtained, wherein the thermally reversible crosslinked matter displays a sufficiently low melt viscosity during heating, has good thermal stability, and is excellent in the heat resistance or in the strength at use temperature.

The reason why such a thing occurs is inferred as follows: the hindered structure hinders the approach of the acid group and the amino group to each other due to steric hindrance and forms an ion crosslinkage with a moderate distance between both groups kept, so the crosslinkage is easy to break due to heating, and in addition, the formation of the irreversible amide bond can also be prevented.

Thus, a thermally reversible crosslinked matter, according to the present invention, comprises a compound (A)-based moiety and a compound (B)-based moiety, wherein both moieties are bonded to each other through a crosslinked structure. This crosslinked matter is characterized in that: the crosslinked structure includes a structure making steric hindrance, and breaks due to heating and then reverts due to cooling; and when the crosslinked structure breaks due to heating, the melt viscosity of the thermally reversible crosslinked matter decreases to not higher than twice the melt viscosity of compound (A) alone or the melt viscosity of compound (B) alone, whichever is higher, as heated at the same temperature that the thermally reversible crosslinked matter is heated at.

It is preferable that the crosslinked structure breaks due to heating and then reverts due to cooling, and that when the crosslinked structure breaks due to heating, the melt viscosity of the thermally reversible crosslinked matter decreases to not higher than the melt viscosity of compound (A) alone or the melt viscosity of compound (B) alone, whichever is higher, as heated at the same temperature that the thermally reversible crosslinked matter is heated at, because inherently excellent mold-processability is obtained.

There can be a modification in which: compound (A) is a compound containing two or more acid groups per molecule; compound (B) is a compound containing two or more hindered amino groups per molecule; and the molar ratio of the acid group to the hindered amino group (acid group/hindered amino group) is in the range of 0.1 to 10.

Although not especially limited, compound (A) can be at least one member selected from the group consisting of polyester compounds, polyepoxy compounds, (meth)acrylic polymers, styrenic polymers, styrenic block copolymers, diene polymers, olefinic polymers, and ethylene-vinyl acetate copolymers. It is preferable that the (meth)acrylic polymers among these thermoplastic polymers are block copolymers, because inherently excellent heat resistance is obtained.

A hot melt resin, according to the present invention, comprises a thermally reversible crosslinked matter as mentioned immediately above.

These and other objects and the advantages of the present invention will be more fully apparent from the following detailed disclosure.

DETAILED DESCRIPTION OF THE INVENTION

In the present invention, a compound which can be compound (A) is a compound containing a carboxyl group, a sulfonic acid group, or a phosphoric acid group, and from a standpoint of the ability to form a crosslinked structure, denotes a compound containing two or more, preferably, three or more, acid groups per molecule. Examples thereof are the following thermoplastic polymers:

di- or more valent carboxylic or sulfonic acid compounds, such as malonic acid, succinic acid, 1,1-cyclopropanedicarboxylic acid, 1,3-acetonedicarboxylic acid, glutaric acid, adipic acid, pimelic acid, suberic acid, azelaic acid, sebacic acid, undecanedicarboxylic acid, isophthalic acid, phthalic acid, terephthalic acid, 1,2-cyclohexanedicarboxylic acid, 1,3-cyclohexanedicarboxylic acid, 1,4-cyclohexanedicarboxylic acid, 1,2-benzenesulfonic acid, 1,3-benzenesulfonic acid, aconitic acid, 1,2,3-propanetricarboxylic acid, 1,2,4-benzenetricarboxylic acid, 1,3,5-benzenetricarboxylic acid, 1,3,5-cyclohexanetricarboxylic acid, 1,2,3,4-butanetetracarboxylic acid, and pyromellitic acid;

polymers as synthesized using α,β-unsaturated carboxylic, sulfonic, or phosphoric acids, such as (meth)acrylic acid, maleic acid, itaconic acid, 4-pentenoic acid, 2-sulfoethyl (meth)acrylate, 2-acrylamido-2-methylpropanesulfonic acid, β-(meth)acryloyloxyethyl hydrogen succinate, β-(meth)acryloyloxyethyl hydrogen phthalate, and methacryloylethyl phosphate, as one comonomer;

polyester compounds having carboxyl groups at molecular terminals of polymers;

polyepoxy compounds into which carboxyl groups are introduced by reacting an epoxy group of epoxy compounds and/or a hydroxyl group with polyvalent carboxylic acids;

styrenic polymers comprising the above-mentioned, α,β-unsaturated carboxylic, sulfonic, or phosphoric acids as one comonomer;

styrenic block copolymers into which carboxyl groups are introduced by adding maleic anhydride;

diene polymers as produced by copolymerizing the above-mentioned, α,β-unsaturated carboxylic, sulfonic, or phosphoric acids, or diene polymers into which carboxyl groups are introduced by adding maleic anhydride;

olefinic polymers as produced by copolymerizing the above-mentioned, α,β-unsaturated carboxylic, sulfonic, or phosphoric acids; and ethylene-vinyl acetate copolymers as produced by copolymerizing the above-mentioned, α,β-unsaturated carboxylic, sulfonic, or phosphoric acids.

Incidentally, the (meth)acrylic polymer, referred to in the present invention, is one kind of polymer as synthesized using at least one member selected from the group consisting of the above-mentioned, α,β-unsaturated carboxylic, sulfonic, and phosphoric acids as a comonomer, wherein the α,β-unsaturated carboxylic acid is (meth)acrylic acid, and the (meth)acrylic polymer is a polymer as synthesized by radical polymerization using (meth)acrylic monomers, such as alkyl (meth)acrylates having 1 to 30 carbon atoms, hydroxyethyl (meth)acrylate, hydroxypropyl (meth)acrylate, and ethoxyethyl (meth)acrylate, as a comonomer.

The (meth)acrylic polymer, for example, may be a polymer as synthesized further using the following comonomers: styrenic monomers such as α-methylstyrene, vinyltoluene, and styrene; vinyl ether monomers such as methyl vinyl ether, ethyl vinyl ether, and isobutyl vinyl ether; fumaric acid and mono- or dialkyl fumarates; maleic acid and mono- or dialkyl maleates; itaconic acid and mono- or dialkyl itaconates; and other monomers such as (meth)acrylonitrile, butadiene, isoprene, vinyl chloride, vinylidene chloride, vinyl acetate, vinyl ketones, vinylpyridine, and vinylcarbazole.

In the present invention, a compound which can be compound (B) is a compound having such a structure as hinders an amide bond formation reaction between an acid group and an amino group due to the possession of a bulky substituent (the possession of steric hindrance) on either or both atoms directly adjacent to an atom to which the amino group is bonded. Specific examples thereof are compounds having a 2,2,6,6-tetramethylpiperidinyl group or a 2,2,6,6-tetramethyl-4-piperidinol group, and more specific examples are as follows:

ester compounds or partial ester compounds of 2,2,6,6-tetramethyl-4-piperidinol with di- to tetravalent carboxylic acids, or condensation products of 2,2,6,6-tetramethyl-4-piperidinylamine with cyanuric chloride and, if necessary, polyvalent amines, or condensation products of N,N-bis(2,2,6,6-tetramethyl-4-piperidinyl)alkylenediamine with cyanuric chloride and, if necessary, polyvalent amines, such as bis(2,2,6,6-tetramethyl-4-piperidinyl)sebacate, bis(1,2,2,6,6-pentamethyl-4-piperidinyl)sebacate, tetrakis(2,2,6,6-tetramethyl-4-piperidinyl)butanetetracarboxylate, tetrakis(1,2,2,6,6-pentamethyl-4-piperidinyl)butanetetracarboxylate, bis(1,2,2,6,6-pentamethyl-4-piperidinyl)-di(tridecyl)-1,2,3,4-butanetetracarboxylate, bis(1,2,2,6,6-pentamethyl-4-piperidinyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensation products, 1,6-bis(2,2,6,6-tetraethyl-4-piperidinylamino)hexane/dibromoethane polycondensation products, 3,9-bis[1,1-dimethyl-2-{tris(2,2,6,6-tetramethyl-4-piperidinyloxycarbonyl)

butylcarbonyloxy}ethyl]-2,4,8,10-tetraoxaspiro[5,5]
undecane, 1,6-bis(2,2,6,6-tetraethyl-4-piperidinylamino)hexane/2,4-dichloro-6-morpholino-s-triazine polycondensation products, 1,6-bis(2,2,6,6-tetraethyl-4-piperidinylamino)hexane/2,4-dichloro-6-tert-octylamino-s-triazine polycondensation products, 1,5,8,12-tetrakis[2,4-bis{N-butyl-N-(2,2,6,6-tetramethyl-4-piperidinyl)amino}-s-triazin-6-yl]-1,5,8,12-tetraazadodecane, 1,5,8,12-tetrakis[2,4bis{N-butyl-N-(1,2,2,6,6-pentamethyl-4-piperidinyl)amino}-s-triazin-6-yl]-1,5,8,12-tetraazadodecane, 1,6,11-tris[2,4-bis{N-butyl-N-(2,2,6,6-tetramethyl-4-piperidinyl)amino}-s-triazin-6-ylamino]undecane, 1,6,11-tris[2,4-bis{N-butyl-N-(1,2,2,6,6-pentamethyl-4-piperidinyl)amino}-s-triazin-6-ylamino]undecane; and polymers as produced by copolymerizing monomers having a 2,2,6,6-tetramethylpiperidinyl group or a 2,2,6,6-tetramethyl-4-piperidinol group, such as 2,2,6,6-tetramethyl-4-piperidinyl (meth)acrylate.

As to properties of the resultant thermally reversible crosslinked matter, those obtained using secondary hindered amino group-containing compounds are preferred to those obtained using tertiary hindered amino group-containing compounds.

The acid group-containing compound and the hindered amino group-containing compound, as mentioned above, need to be melted at high temperature. The high temperature, referred to herein, is a temperature where the conventional processing of the thermoplastic resin is carried out, and desirably, it is in the range of 100 to 250° C.

The respective molecular weights of the acid group-containing compound and the hindered amino group-containing compound, as mentioned above, are not especially limited if these compounds melt at high temperature, and those which range from a low molecular weight of about 100 to a high molecular weight of about 1,000,000 can be used.

The ratio of the melt viscosity of the thermally reversible crosslinked matter, according to the present invention, at high temperature to the melt viscosity of compound (A) or (B), whichever is higher, at the same temperature as the high temperature (thermally reversible crosslinked matter viscosity/compound viscosity) is 2 or less, preferably, 1.5 or less, more preferably, 1 or less. A crosslinked matter using conventional ion crosslinking has an ion crosslinkage that is difficult to break even in a melted state, and therefore displays high viscosity, wherein the ratio of the melt viscosity after crosslinking to that before crosslinking is over 10.

The molar ratio of the acid group of the acid group-containing compound to the amino group of the hindered amino group-containing compound (acid group/amino group) is preferably in the range of 0.1 to 10, more preferably, 0.3 to 3.0. Outside these ranges, the number of the crosslinking sites is so excessively small that the desirable heat resistance is difficult to display, or either group is present in such an excessive amount that many molecules do not participate in the crosslinking and the heat resistance is easily deteriorated. Incidentally, if the ratio is in the range of 0.3 to 3.0, the crosslinking can efficiently be carried out.

(Effects and Advantages of the Invention)

The thermally reversible crosslinked matter and the hot melt resin, according to the present invention, display a sufficiently low melt viscosity during heating and are also excellent in the stability of the melt viscosity, because the thermally reversible crosslinked matter and the hot melt resin have the thermally reversible structure that is a steric hindrance structure as represented by an ion crosslinkage which is, for example, formed between an acid group and an amino group of a hindered amino group.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to these examples. Hereinafter, the units "%" and "part(s)" denote those by weight. Incidentally, the number-average molecular wight (Mn) and the weight-average molecular wight (Mw) were determined in terms of polystyrene by gel permeation chromatography (GPC).

Properties of crosslinked matters were measured by the following methods:

(Preparation of sample)

The crosslinked matter, which was melted, was coated to a PET film with a GPD coater (made by Yuri Roll Machine Co., LTD.) so that the coating thickness might be 25 μm, thus obtaining a sample.

(Holding Power)

The sample was attached to a stainless steel plate in an adhesion area of 25 mm×25 mm and then pressed by running a roller of 2 kg back and forth on the sample, and the temperature of the sample was adjusted at a predetermined temperature (80° C.) for 30 minutes. Then, a load of 1 kg was applied to the sample, when a time, which passed until the sample fell off, was measured, or how much the sample slipped down after 24 hours was measured (unit: mm). The longer the time passes until the sample falls off, the better the heat resistance is. Or the less the sample slips down after 24 hours, the better the heat resistance is.

(Viscosity at 180° C.)

The viscosity was measured with a flow tester CFT-500C (made by Shimadzu Corporation) under conditions of temperature=180° C., load=10 kgf/cm$^2$, die shape=0.5 mmφ×1 mm. The viscosity after desolvation was measured to a residue as obtained by treating a polymer solution with a vacuum drier of 180° C. for 1 hour.

EXAMPLE 1

A mixture of 175.5 g of methyl methacrylate, 3.6 g of acrylic acid, 0.9 g of tetraethylene glycol diacrylate, and 140 g of ethyl acetate was placed into a four-necked flask of 2 liters as equipped with a stirrer, a nitrogen-introducing tube, a dropping funnel, a thermometer, and a condenser, and the mixture was heated to 85° C. under a nitrogen atmosphere. After the internal temperature of the flask reached 85° C., 3 g of pentaerythritol tetrakisthioglycolate, 0.54 g of 2,2-azobis(2-methylbutyronitrile) (ABN-E, made by Japan Hydrazine Co., Inc.), and 20 g of ethyl acetate were added into the flask to initiate a polymerization. At both 50 minutes and 80 minutes after the polymerization initiation, 1.5 g of pentaerythritol tetrakisthioglycolate, 0.27 g of ABN-E, and 10 g of ethyl acetate were added into the flask. Then, 140 minutes later, the conversion of methyl methacrylate reached 81.8%. Subsequently, 411.6 g of butyl acrylate, 8.4 g of acrylic acid, and 400 g of ethyl acetate were dropped from the dropping funnel to the reaction solution over a period of 2 hours. At both 30 minutes and 60 minutes after the dropping had finished, 0.18 g of ABN-E and 5 g of ethyl acetate were added, and further 60 minutes after, 0.6 g of azobisisobutyronitrile and 10 g of ethyl acetate were added. The reaction was further carried out for 2 hours under reflux, and the reaction solution was then cooled to room temperature to finish the reaction, thus obtaining an acrylic star-shaped block copolymer containing acid groups. The resultant star-shaped block copolymer had a number-average molecular weight (Mn) of 26,900 and a weight-average molecular weight (Mw) of 150,000.

To 100 parts (in terms of solid content) of this star-shaped block copolymer, 5.49 parts of ADEKASTAB LA-57 (made by Asahi Denka Kogyo K.K.), which is a hindered amine, was added, and they were well mixed and then desolvated with a vacuum drier, thus obtaining a pale yellow transparent, thermally reversible crosslinked matter.

EXAMPLE 2

A thermally reversible crosslinked matter was obtained in the same way as of Example 1 except that the type of the hindered amino group-containing compound being added was changed.

EXAMPLE 3

A mixture of 167.8 g of methyl methacrylate, 11.2 g of ADEKASTAB LA-87 (2,2,6,6-tetramethyl-4-piperidinyl methacrylate made by Asahi Denka Kogyo K.K.), 0.9 g of tetraethylene glycol diacrylate, and 140 g of ethyl acetate was placed into a four-necked flask of 2 liters as equipped with a stirrer, a nitrogen-introducing tube, a dropping funnel, a thermometer, and a condenser, and the mixture was heated to 85° C. under a nitrogen atmosphere. After the internal temperature of the flask reached 85° C., 3 g of pentaerythritol tetrakisthioglycolate, 0.54 g of ABN-E (made by Japan Hydrazine Co., Inc.), and 20 g of ethyl acetate were added into the flask to initiate a polymerization. At both 50 minutes and 80 minutes after the polymerization initiation, 1.5 g of pentaerythritol tetrakisthioglycolate, 0.27 g of ABN-E, and 10 g of ethyl acetate were added into the flask. Then, 120 minutes later, the conversion of methyl methacrylate reached 77.2%. Subsequently, 393.8 g of butyl acrylate, 26.2 g of ADEKASTAB LA-87 (made by Asahi Denka Kogyo K.K.), and 400 g of ethyl acetate were dropped from the dropping funnel to the reaction solution over a period of 2 hours. At both 30 minutes and 60 minutes after the dropping had finished, 0.18 g of ABN-E and 5 g of ethyl acetate were added, and further 60 minutes after, 0.6 g of azobisisobutyronitrile and 10 g of ethyl acetate were added. The reaction was further carried out for 2 hours under reflux, and the reaction solution was then cooled to room temperature to finish the reaction, thus obtaining an acrylic star-shaped block copolymer containing hindered amino groups. The resultant star-shaped block copolymer had a number-average molecular weight (Mn) of 5,700 and a weight-average molecular weight (Mw) of 12,800.

To 100 parts of this star-shaped block copolymer, 0.59 parts of pyromellitic acid was added, and they were well mixed and then desolvated with a vacuum drier, thus obtaining a yellow, thermally reversible crosslinked matter.

EXAMPLE 4

A thermally reversible crosslinked matter was obtained in the same way as of Example 3 except that the type of the acid group-containing compound being added was changed.

EXAMPLE 5

To 100 parts of the hindered amino group-containing star-shaped block copolymer as synthesized in Example 3, 100 parts of the acid group-containing star-shaped block copolymer as synthesized in Example 1 was added, and they were well mixed and then desolvated with a vacuum drier, thus obtaining a pale yellow transparent, thermally reversible crosslinked matter.

Comparative Examples 1 and 2

The noncrosslinked star-shaped block copolymers as synthesized in Examples 1 and 3 were taken as comparative examples, respectively.

Comparative Examples 3 to 6

Thermally reversible crosslinked matters were obtained in the same way as of Example 1 except that compounds as shown in Tables 3 and 4 were used.

TABLE 1

|  | Example 1 | Example 2 | Example 3 |
|---|---|---|---|
| Compound (A) (phr) | Polymer A[2) 100 | Polymer A[2) 100 | Pyromellitic acid 0.59 |
| Compound (B) (phr) | ADEKASTAB LA-57[3) 5.49 | ADEKASTAB LA-77[4) 6.68 | Polymer B[5) 100 |
| COOH/NH (mol/mol) | 1/1 | 1/1 | 1/3 |
| Holding power at 80° C.[1) | >24 h (slip: 6.5 mm) | 606 minutes | >24 h (slip: 0 mm) |
| Viscosity at 180° C. (cps) | 12,000 | 11,600 | 28,000 |

[1)It was shown as the falling time or the degree of the slipping after 24 hours.
[2)Acid group-containing acrylic star-shaped block copolymer as set forth in Example 1.
[3)Tetrakis(2,2,6,6-tetramethyl-4-piperidinyl) butanetetracarboxylate (made by Asahi Denka Kogyo K.K.)
[4)Bis(2,2,6,6-tetramethyl-4-piperidinyl) sebacate (made by Asahi Denka Kogyo K.K.)
[5)Hindered amino group-containing acrylic star-shaped block copolymer as set forth in Example 3.

TABLE 2

|  | Example 4 | Example 5 |
|---|---|---|
| Compound (A) (phr) | 1,2,3,4-Butanetetracarboxylic acid 4.89 | Polymer A[2) 100 |
| Compound (B) (phr) | Polymer B[5) 100 | Polymer B[5) 100 |
| COOH/NH (mol/mol) | 3/1 | 1/1 |
| Holding power at 80° C.[1) | 252 minutes | 684 minutes |
| Viscosity at 180° C. (cps) | 14,200 | 19,200 |

[1)It was shown as the falling time or the degree of the slipping after 24 hours.
[2)Acid group-containing acrylic star-shaped block copolymer as set forth in Example 1.
[5)Hindered amino group-containing acrylic star-shaped block copolymer as set forth in Example 3.

TABLE 3

|  | Comparative Example 1 | Comparative Example 2 | Comparative Example 3 |
|---|---|---|---|
| Compound (A) (phr) | Polymer A[2) 100 | — | Polymer A[2) 100 |
| Additive (phr) | — | Polymer B[5) 100 | Zinc acetate dihydrate |

TABLE 3-continued

|  | Comparative Example 1 | Comparative Example 2 | Comparative Example 3 |
|---|---|---|---|
| COOH/Zn (mol/mol) | — | — | 6.10 1/1 |
| Holding power at 80° C.[1] | 246 minutes | 3 minutes | >24 h (slip: 0.1 mm) |
| Viscosity at 180° C. (cps) | 20,406 | 15,800 | 407,700 |

[1] It was shown as the falling time or the degree of the slipping after 24 hours.
[2] Acid group-containing acrylic star-shaped block copolymer as set forth in Example 1.
[3] Hindered amino group-containing acrylic star-shaped block copolymer as set forth in Example 3.

TABLE 4

|  | Comparative Example 4 | Comparative Example 5 | Comparative Example 6 |
|---|---|---|---|
| Compound (A) (phr) | Polymer A[2] 100 | Polymer A[2] 100 | Polymer A[2] 100 |
| Additive (phr) | Zinc acetate dihydrate 6.10 o-Methoxybenzoic acid 4.23 | Octanediamine 2.00 | N,N,N',N'-tetramethyl-1,6-hexane-diamine 2.40 |
| COOH/Zn or N (mol/mol) | 1/1 | 1/1 | 1/1 |
| Holding power at 80° C.[1] | >24 h (slip: 0.1 mm) | 294 minutes | 216 minutes |
| Viscosity at 180° C. (cps) | 87,100 | >1,000,000 | 29,900 |

[1] It was shown as the falling time or the degree of the slipping after 24 hours.
[2] Acid group-containing acrylic star-shaped block copolymer as set forth in Example 1.

The holding power at 80° C. and the viscosity at 180° C. for the thermally reversible crosslinked matters of Examples 1 to 5, the polymers of Comparative Examples 1 and 2, and the comparative crosslinked matters of Comparative Examples 3 to 6, as mentioned above, were shown in Tables 1 to 4.

As is understood from the measurement results of Examples 1 and 2 and Comparative Example 1, the holding power at 80° C. of the thermally reversible crosslinked matters of Examples 1 and 2 is greatly enhanced due to an ion crosslinkage as formed between an acid group of compound (A) and an amino group of the hindered amine, when compared with the holding power at 80° C. of compound (A) to which no hindered amine is added. In addition, it would be understood that the viscosity at 180° C. of the thermally reversible crosslinked matters of Examples 1 and 2 is lower than that of compound (A) to which no hindered amine is added, and that the crosslinkages in the thermally reversible crosslinked matters of Examples 1 and 2 are, therefore, entirely broken. It is a more preferred embodiment that the melt viscosity of the thermally reversible crosslinked matters is lower because when melted, the thermally reversible crosslinked matters free the hindered amine due to the breaking of the crosslinkages in the thermally reversible crosslinked matters, and this freed hindered amine serves as a plasticizer.

As is understood from the measurement results of Examples 3 and 4 and Comparative Example 2, the holding power at 80° C. of the thermally reversible crosslinked matters of Examples 3 and 4 is greatly enhanced due to an ion crosslinkage as formed between a hindered amino group of compound (B) and an acid group of the polyvalent carboxylic acid, when compared with the holding power at 80° C. in the case where no polyvalent carboxylic acid is added. In addition, it would be understood that as to Example 3, the melt viscosity of the thermally reversible crosslinked matter is higher than that of compound (B), to which no polyvalent carboxylic acid is added, but the crosslinkages are relatively easy to break.

As is understood from the measurement results of Example 5 and Comparative Examples 1 and 2, the holding power at 80° C. of the thermally reversible crosslinked matter of Example 5 is greatly enhanced due to an ion crosslinkage as formed between an acid group of compound (A) and a hindered amino group of compound (B), when compared with the holding power at 80° C. of compound (A) alone and with that of compound (B) alone. In addition, it would be understood that the viscosity at 180° C. of the thermally reversible crosslinked matter of Example 5 is lower than that of compound (A) which displays higher viscosity than compound (B), and that the crosslinkages in the thermally reversible crosslinked matter of Example 5 are, therefore, entirely broken.

It would be understood that the composition of Comparative Example 3 using a metal crosslinkage is more excellent in the holding power at 80° C. than the thermally reversible crosslinked matter of Example 1, but displays much higher viscosity at 180° C. than the uncrosslinked resin of Comparative Example 1, and that the crosslinkages in the composition of Comparative Example 3 are, therefore, not entirely broken even at high temperature.

It would be understood that the viscosity at 180° C. of the system of Comparative Example 4 as obtained by adding o-methoxybenzoic acid to a metal-crosslinked matter is considerably lower than that of Comparative Example 3, but is considerably higher than the viscosity of the uncrosslinked resin, and that the crosslinkages in the system of Comparative Example 4 are, therefore, not entirely broken at high temperature, either.

It would be understood that the crosslinked matter of Comparative Example 5 using a primary diamine displays a little enhanced holding power at 80° C., but is inferior to Examples 1 and 2, and further, displays very high viscosity at 180° C. and has crosslinkages that are difficult to break.

In addition, in Comparative Examples 3 and 5, the viscosity gradually increased due to heating and at last gelled.

It would be understood that the crosslinked matter of Comparative Example 6 using a tertiary diamine displays no enhancement of the holding power at 80° C., and therefore, forms no ion crosslinkage.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A thermally reversible crosslinked matter, comprising a compound (A)-based moiety and a compound (B)-based moiety, wherein both moieties are bonded to each other through a crosslinked structure, which is characterized in that: the crosslinked structure includes a structure making steric hindrance, and breaks due to heating and then reverts due to cooling; and when the crosslinked structure breaks due to heating, the melt viscosity of the thermally reversible crosslinked matter decreases to not higher than twice the melt viscosity of compound (A) alone or the melt viscosity of compound (B) alone, whichever is higher, when heated at the same temperature that the thermally reversible crosslinked matter is heated at.

2. A thermally reversible crosslinked matter according to claim 1, wherein: the crosslinked structure breaks due to heating and then reverts due to cooling; and when the crosslinked structure breaks due to heating, the melt viscosity of the thermally reversible crosslinked matter decreases to not higher than the melt viscosity of compound (A) alone or the melt viscosity of compound (B) alone, whichever is higher, when heated at the same temperature that the thermally reversible crosslinked matter is heated at.

3. A thermally reversible crosslinked matter according to claim 1, wherein: compound (A) is a compound containing two or more acid groups per molecule; compound (B) is a compound containing two or more hindered amino groups per molecule; and the molar ratio of the acid group to the hindered amino group (acid/hindered amino group) is in the range of 0.1 to 10.

4. A thermally reversible crosslinked matter according to claim 1, wherein compound (A) is at least one member selected from the group consisting of polyester compounds, polyepoxy compounds, (meth)acrylic polymers, styrenic polymers, styrenic block copolymers, diene polymers, olefinic polymers, and ethylene-vinyl acetate copolymers.

5. A thermally reversible crosslinked matter according to claim 4, wherein the (meth)acrylic polymers are block copolymers.

6. A hot melt resin, comprising a thermally reversible crosslinked matter as recited in claim 1.

7. A thermally reversible crosslinked matter according to claim 2, wherein: compound (A) is a compound containing two or more acid groups per molecule; compound (B) is a compound containing two or more hindered amino groups per molecule; and the molar ratio of the acid group to the hindered amino group (acid/hindered amino group) is in the range of 0.1 to 10.

8. A thermally reversible crosslinked matter according to claim 2, wherein compound (A) is at least one member selected from the group consisting of polyester compounds, polyepoxy compounds, (meth)acrylic polymers, styrenic polymers, styrenic block copolymers, diene polymers, olefinic polymers, and ethylene-vinyl acetate copolymers.

9. A thermally reversible crosslinked matter according to claim 3, wherein compound (A) is at least one member selected from the group consisting of polyester compounds, polyepoxy compounds, (meth)acrylic polymers, styrenic polymers, styrenic block copolymers, diene polymers, olefinic polymers, and ethylene-vinyl acetate copolymers.

10. A hot melt resin, comprising a thermally reversible crosslinked matter as recited in claim 2.

11. A hot melt resin, comprising a thermally reversible crosslinked matter as recited in claim 3.

12. A hot melt resin, comprising a thermally reversible crosslinked matter as recited in claim 4.

13. A hot melt resin, comprising a thermally reversible crosslinked matter as recited in claim 5.

14. A thermally reversible crosslinked matter, comprising:

a) a compound (A)-based moiety and a compound (B)-based moiety, wherein both moieties are bonded to each other through a crosslinked structure;

b) wherein the crosslinked structure comprises a structure making steric hindrance;

c) wherein the crosslinked structure breaks due to heating and then reverts due to cooling;

d) wherein, when the crosslinked structure and thermally reversible crosslinked matter are heated at the same temperature and when the crosslinked structure breaks due to heating, the melt viscosity of the thermally reversible crosslinked matter decreases to not higher than twice the melt viscosity of compound (A) alone or the melt viscosity of compound (B) alone, whichever is higher; and e) wherein the structure making steric hindrance is a hindered amine, and wherein the hindered amine is an aliphatic cyclic amine.

15. The thermally reversible crosslinked matter according to claim 14, wherein the aliphatic cyclic amine includes a 2,2,6,6-tetramethylpiperidinyl group or a 2,2,6,6-tetramethyl-4-piperidinol group.

16. A thermally reversible crosslinked matter, comprising:

a) a compound (A)-based moiety and a compound (B)-based moiety, wherein both moieties are bonded to each other through a crosslinked structure;

b) wherein the crosslinked structure comprises a structure making steric hindrance;

c) wherein the crosslinked structure breaks due to heating and then reverts due to cooling;

d) wherein, when the crosslinked structure and thermally reversible crosslinked matter are heated at the same temperature and when the crosslinked structure breaks due to heating, the melt viscosity of the thermally reversible crosslinked matter decreases to not higher than twice the melt viscosity of compound (A) alone or the melt viscosity of compound (B) alone, whichever is higher; and e) wherein the thermally reversible crosslinked matter is obtained by reacting the compound (A)-based moiety and the compound (B)-based moiety with each other in the temperature range of 100 to 250° C.

* * * * *